(12) United States Patent
Bierweiler et al.

(10) Patent No.: US 10,768,188 B2
(45) Date of Patent: Sep. 8, 2020

(54) DIAGNOSTIC DEVICE AND METHOD FOR MONITORING OPERATION OF A TECHNICAL SYSTEM

(71) Applicant: Siemens Aktiengesellschaft, Munich (DE)

(72) Inventors: Thomas Bierweiler, Karlsruhe (DE); Daniel Labisch, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 399 days.

(21) Appl. No.: 15/665,636

(22) Filed: Aug. 1, 2017

(65) Prior Publication Data

US 2018/0031587 A1 Feb. 1, 2018

(30) Foreign Application Priority Data

Aug. 1, 2016 (EP) .................................... 16182137

(51) Int. Cl.
*G01N 35/00* (2006.01)
*G05B 23/02* (2006.01)
*G06N 3/08* (2006.01)

(52) U.S. Cl.
CPC . *G01N 35/00693* (2013.01); *G01N 35/00584* (2013.01); *G05B 23/0221* (2013.01); *G06N 3/088* (2013.01); *G05B 23/024* (2013.01)

(58) Field of Classification Search
CPC ................... G01N 35/00693; G01N 35/00584
See application file for complete search history.

(56) References Cited

U.S. PATENT DOCUMENTS 6,314,413 B1 * 11/2001 Otte ..................... G05B 13/027
706/15
2003/0140143 A1  7/2003 Wolf et al.
2004/0111385 A1  6/2004 Starkey
(Continued)

FOREIGN PATENT DOCUMENTS

CN          1800809       7/2006
CN        101027617       8/2007
(Continued)

OTHER PUBLICATIONS

Office Action dated Sep. 18, 2019 issued in Chinese Patent Application No. 201710644345.4.
(Continued)

*Primary Examiner* — Manuel L Barbee
(74) *Attorney, Agent, or Firm* — Cozen O'Connor

(57) ABSTRACT

A diagnostic device and diagnostic method for monitoring operation of a technical system with an automation system, wherein values of process variables, which were previously automatically determined as relevant to a diagnosis by analyzing a program for a sequential function chart, are determined when each step of the cycle to be checked is executed and evaluated based on at least one predetermined self-organizing map acquired based on fault-free cycles during a system operation with repeatedly run step sequences such that automatic preselection of the process variables which are relevant to the diagnosis is performed such that misdiagnoses can advantageously and largely be avoided and the reliability of the diagnostic statement can be increased.

14 Claims, 4 Drawing Sheets

(56) References Cited

U.S. PATENT DOCUMENTS

| | | |
|---|---|---|
| 2006/0142990 A1 | 6/2006 | Vatchkov et al. |
| 2006/0155734 A1 | 7/2006 | Grimes |
| 2007/0028219 A1 | 2/2007 | Miller et al. |
| 2007/0244841 A1 | 10/2007 | Vatchkov et al. |
| 2009/0204267 A1* | 8/2009 | Sustaeta ............ G05B 13/0285 700/291 |
| 2011/0060708 A1* | 3/2011 | Suzuki .................. G06N 20/00 706/12 |
| 2015/0073751 A1 | 3/2015 | Liao et al. |
| 2018/0190378 A1* | 7/2018 | Takei .................... G16H 40/40 |

FOREIGN PATENT DOCUMENTS

| | | | |
|---|---|---|---|
| EP | 1472846 B1 | 8/2005 | |
| EP | 2472440 | 4/2012 | |
| EP | 2472440 A1 * | 7/2012 | ........... G06N 3/0454 |
| WO | WO02/056248 | 7/2002 | |
| WO | WO 2007/149367 | 12/2007 | |
| WO | WO2013/155421 | 10/2013 | |

OTHER PUBLICATIONS

Christian W. Frey "Monitoring of Complex Industrial Processes based on Self-Organising Maps and Watershed Transformations", Fraunhofer Institute IOSB, Mar. 11, 2016.

Office Action dated Mar. 10, 2020 issued in Chinese Patent Application No. 201710644345.4.

* cited by examiner

DIAGNOSTIC DEVICE AND METHOD FOR MONITORING OPERATION OF A TECHNICAL SYSTEM

BACKGROUND OF THE INVENTION

1. Field of the Invention

The invention relates to a diagnostic method and a diagnostic device for monitoring the operation of a technical system with an automation system.

2. Description of the Related Art

The maintenance and repair of automation technology systems can be improved if the correct function of subsystems or components is monitored. With a decreasing functionality, action can be taken specifically at the correct point in the system to implement measures for maintenance, upkeep or error correction.

The article "Monitoring of Complex Industrial Processes based on Self-Organising Maps and Watershed Transformations" by Christian W. Frey, Fraunhofer Institute IOSB, dated Mar. 11, 2016, discloses a diagnostic method for monitoring complex industrial processes, in which a self-organizing map is trained for an error-free behavior of the process based on process variables, in other words based on recorded values of measured variables and the values of the controlled variables output to the process. According to Wikipedia dated 4 Mar. 2016, a type of artificial neural network is referred to as a "self-organizing map" (SOM) or "self-organizing feature map" (SOFM). As an unmonitored learning process they are a powerful tool in data mining. Their operating principle is based on the biological knowledge that many structures in the brain have a linear or planar topology. Based on the self-organizing map that is predetermined in accordance with the above article, the subsequent operating behavior is compared with the acquired error-free behavior. In this way, a differing behavior is identified, which can subsequently be analyzed for causes and possible errors in the operation of the process.

The disadvantage with the conventional diagnostic method is, however, that the process variables to be evaluated and their current values are determined by listening into the field bus communication without, in the process, the process variables to be evaluated being selected especially. Process variables that have no relevance to the diagnosis and may therefore falsify the diagnostic statement may therefore disadvantageously also be included in the evaluation for determining a diagnostic statement.

SUMMARY OF THE INVENTION

In view of the foregoing, it is therefore an object of the invention to provide a diagnostic device and a diagnostic method for monitoring the operation of a technical system, which is characterized by an improved reliability of the diagnostic statement.

This and other objects and advantages are achieved in accordance with the invention by a diagnostic device, a diagnostic method, a computer program for performing the diagnostic method and a corresponding computer program.

In accordance with the invention, the diagnostic method can be applied to various method, manufacturing and process technology systems, because technical sequences are typically controlled by step sequences, which are also referred to as batch recipes, batch controllers, sequencers or sequential function charts (SFC). The sequence of the individual steps can underlie both production-specific fluctuations and also those caused by errors. By obtaining a highly reliable diagnostic statement, improvements are seen in the reliability of the system operation and the fulfillment of high-quality targets using the technical system. In such cases, unusual variances from the normal fluctuations are reliably differentiated.

Step sequences are implemented by a program for controlling the operating sequence, which runs in a programmable logic controller, for instance. Controlled variables are typically set in the steps in the step sequences, by which the process running on the system is interfered with. The transition to the next step in a step sequence either occurs purely in a time-controlled manner or, in the usual case, when specific target values are reached by one or a number of measured variables. Knowledge of the process that was introduced, for instance, by a process engineer or chemical engineer in the engineering of the automation system, particularly when creating the program for controlling the sequence during operation of the system (SFC), is hidden behind the controlled variables and measured variables that are used in the control program to monitor transition conditions. In a particularly advantageous manner, the process variables to be evaluated are now selected based on the controlled variables and transition conditions of the SFC.

To this end the SFC, which exists as a result of the engineering, is analyzed using an evaluation device. During this analysis the controlled variables set in the step sequence and the measured variables queried for the transitions are automatically determined. This is advantageous in that only the process variables that are used for the process control and which are relevant to the diagnosis are included in the determination of a diagnostic statement. The object of obtaining a reliable diagnostic statement is achieved generically by the use of one or a number of self-organizing maps. The controlled and measured variables included in the diagnosis are controlled directly by the step sequence or are evaluated herein. As a result, it is ensured that the monitored process variables are usefully linked together and are thus meaningful for a diagnosis.

In the SIMATIC PCS 7 control system, SFCs are coupled to Continuous Function Charts (CFCs). A CFC is a graphics editor that is run on the software package STEP 7. For this purpose, it serves to create an overall software structure for an automation solution from prefabricated blocks. To this end, blocks are placed, parameterized and connected on function diagrams. If desired, the input and output signals of the CFCs can additionally be included in the diagnosis. These are then likewise determined as process variables that are relevant to the diagnosis and similarly to the process variables that were determined based on the SFC are recorded in data records and self-organizing maps.

The invention is also advantageous in that the novel diagnosis is characterized by high flexibility and easy applicability. This means that an n-tuple with n coordinates is automatically determined in an automatic learning process for each node of the self-organizing map, which represents an error-free cycle through the step sequence, where each coordinate stands for a value of a process variable, in other words a specific controlled variable or measured variable, which is automatically determined as relevant to the diagnosis, of a step which is run through in the learning process. The set controlled variables or recorded measured variables of the individual steps in a step sequence are therefore used as input variables when learning the self-organizing map. The process variables can vary with various cycles, even if there is no error. As a result, values of the process variables of a number of well-run cycles of the step sequences are used as training data in order to learn the self-organizing map. During the learning process, at each node the self-organizing map stores typical values of the process variables for the individual steps as good values. At the start of the learning process, a map of the size 8×12 nodes can be used, for instance. Naturally differing variables can also be used. After the learning process, the training data can be used to monitor the map size. If the map is too large, the individual nodes of the map are encountered only once or not at all by the training data. If a map has proven to be too large, in a next learning process a slightly smaller map size can be selected and the learning process can be re-started. The new type of diagnosis thus advantageously requires the operator to have limited knowledge of the system to be monitored and can be used practically universally. If values of the process variables differ too significantly from the good values stored on the nodes of the previously acquired self-organizing map during the diagnostic operation with individual steps of a cycle to be checked, then this represents an indication of an error in the monitored system. Possible more accurate knowledge about the process running in each case on the monitored system is only required for the subsequent analysis of the cause of the fault.

A more exact mapping of the good behavior can advantageously be archived if a separate self-organizing map with training data is created and stored for each individual step in the step sequence in each case. In such cases, the individual data records of the nodes contain, as already described, values of all process variables which are automatically determined from the engineering and are relevant to the diagnosis. As a result, the reliability of the diagnostic statement can be further increased.

For the previously described case of a self-organizing map for each step, a reduction in the data volume can advantageously be achieved via a variation, adjusted to the respective step, in the dimension of the data records. To this end, only the controlled variables and/or the measured variables set in the respective step, which are queried in the respective step for monitoring a transition condition, are automatically determined as process variables that are relevant to the diagnosis in the respective step. On account of the thus reduced data volume, the need for computing capacity reduces and the evaluation of the data performed to determine the diagnostic statement is accelerated.

By evaluating a data record with the values of the process variables of each step for a cycle to be checked on the basis of the self-organizing map, variances in the system behavior are detected and indicated during the cycle, to be checked, of previously acquired values of error-free cycles that are deposited in the predetermined self-organizing map. The smallest Cartesian distance between the data record of the cycle to be checked and the nodes of the self-organizing map is preferably determined to detect a variance in the system behavior. That node in the map having the smallest Cartesian distance from the data record of the cycle to be checked is determined as the winner node.

In accordance with a particularly advantageous embodiment of the invention, a variance from the normal behavior in the case of the cycle, to be checked, in the step sequence is then indicated as the diagnostic statement if the distance from the winner node exceeds a predetermined threshold value. Similarly to learning the nodes of the self-organizing map, the threshold values can be automatically determined based on data records of error-free cycles. To this end, the respective winner nodes can be ascertained with the data records and the respective Cartesian distances between the data records and the associated winner nodes can be determined. The distance from its winner node that produces a data record in each case can then be calculated as a threshold value and predetermined in this way in order to avoid misdiagnoses in each case increased by a safety margin of for instance 5 to 50%, preferably 15%.

In principle, the predetermination of the nodes of the self-organizing map could occur in any manner, such as by an operator manually inputting the values of the process variables. Advantageously a learning method that is simple to implement and that does not require complicated inputs from an operator and limited knowledge about the operation of the system can, however, be applied to predetermine the self-organizing map. To this end, a number of data records identifying an error-free operation of the system are stored prior to a cycle, to be checked, in the data storage unit and based on these data records via the learning method the n-tuples with the values of the process variables for error-free cycles for the nodes of the map are calculated and are deposited hereupon, i.e., are saved assigned to the nodes. The map that is predetermined in this way can be used immediately to evaluate a cycle to be checked. Naturally, corrections can, however, also still be performed subsequently by an operator to the individual data of the map. Furthermore, a mask can additionally be offered to the operator when setting up the diagnostic function, with the aid of which further process variables which, in his opinion, are likewise relevant to the diagnosis can be added to the data records as additional coordinates or removed therefrom.

In an automation environment, the diagnostic device can advantageously comprise a software function block, which can be connected in a graphical user interface of an engineering system to function blocks of automation programs and can be loaded into an automation device for operation of the diagnostic device, for instance. Variances identified in process variables of individual steps, which indicate an error in the system, are then indicated on a "faceplate" for realizing a human-machine interface on a control and process monitoring device of the automation-technology system. Modifications to the self-organizing map or to the threshold values, which are assigned to the individual nodes in effect as variance sensitivity, can, if desired, be implemented on this control and process monitoring system by a user.

The diagnostic device for monitoring the operation of a technical system in accordance with the invention, particularly the data storage unit and the evaluation device, can be implemented particularly advantageously in a software environment for Cloud-based system monitoring. A software environment of this type represents the data-based remote service "Control Performance Analytics" from Siemens AG, for instance. Data from customer's systems is collected with the aid of software agents, aggregated and sent to a Siemens service operation center, in which the collected data is stored on a remote service computer. There, the collected data is semi-automatically evaluated with the aid of various data analytics software applications. If necessary, experts who are specially skilled in the remote service can work highly efficiently on this database. The results of the data analysis can be indicated on a monitor of the remote service computer and/or provided on a Sharepoint, so that they can be viewed by the end customer, i.e., the operator of the technical system, in a browser for instance.

The diagnostic method is thus preferably implemented in software or in a combination of software and hardware, so that the invention also relates to a computer program with program code instructions that can be executed by a computer to implement the diagnostic method. In this context, the invention also relates to a computer program product, in particular a data carrier or a storage medium, with a computer program of this type that can be executed by a computer. Such a computer program can, as described above, be provided in a storage unit of a programmable logic controller or can be loaded herein, so that during operation of the programmable logic controller operation of the technical system can be automatically monitored, or with Cloud-based monitoring of a technical system the computer program can be provided in a storage unit of a remote service computer or can be loaded herein.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and its embodiments and advantages are explained in greater detail on the basis of the drawings in which an exemplary embodiment of the invention is illustrated, in which.

DETAILED DESCRIPTION OF THE EXEMPLARY EMBODIMENTS

Figure 1:
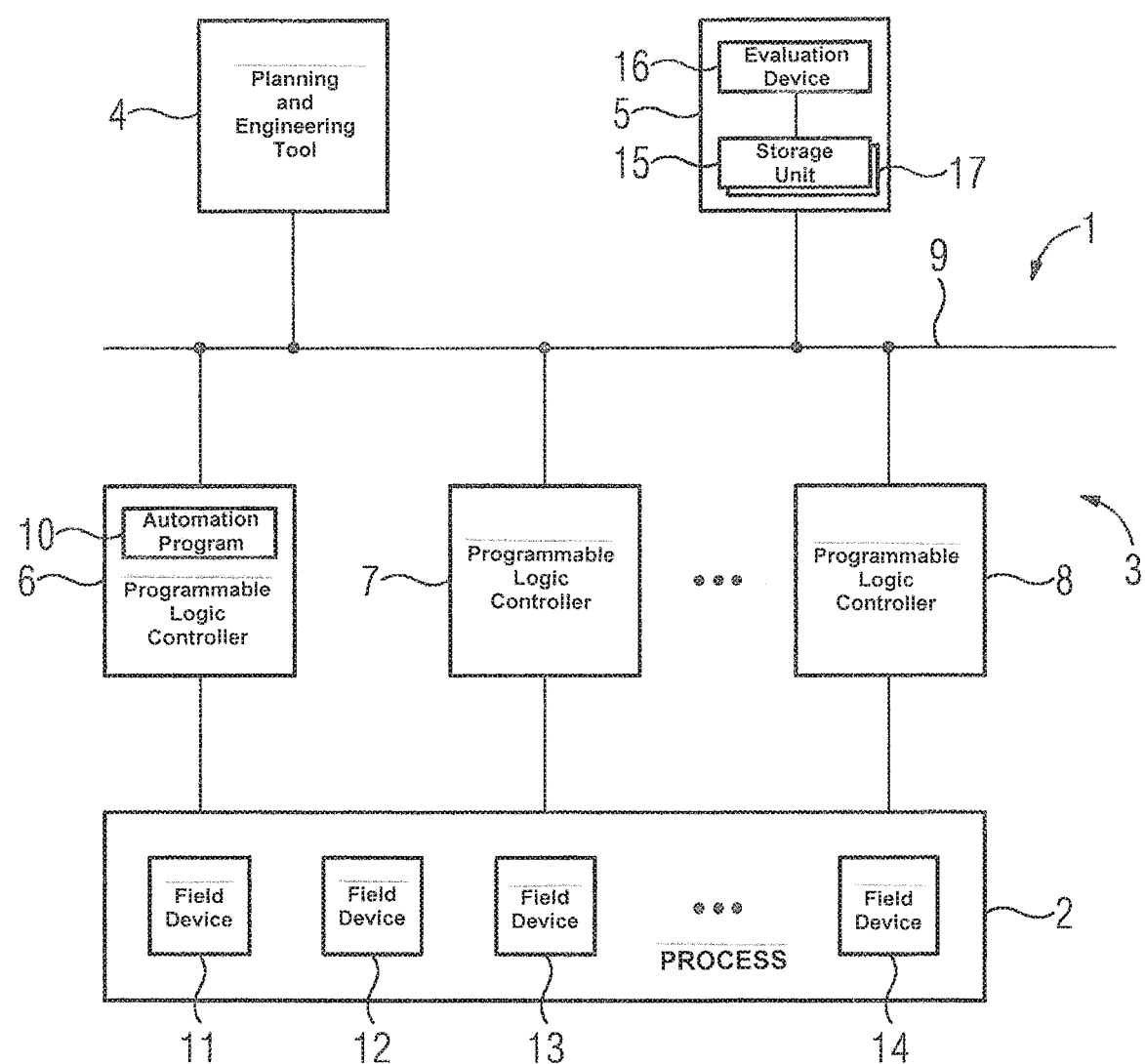
FIG. 1 shows an exemplary technical system in accordance with the invention.

As an example, FIG. 1 shows a simplified schematic view of a process-technology system 1, in which a process 2 is controlled via an automation system 3. The automation system 3 contains a planning and engineering tool 4, a control and monitoring device 5 and a plurality of programmable logic controllers 6, 7, 8 that are connected to one another via a bus system 9 for data communication. The programmable logic controllers 6, 7, 8 control the technical process 2 in accordance with automation programs, of which by way of example in FIG. 1 one automation program 10 is included. The automation program 10 consists in most cases, for instance, of a number of function blocks that can interact with further function blocks distributed in the automation system 3, and a sequential function chart. The sequential function chart realizes a control with an automatic step-wise sequence, which as a function of conditions switches ahead from one step to the following step in the manner of a step sequence. The runtime properties of the various function blocks define how the individual blocks within the entire structure of the automation system are added into the temporal sequence of the processing.

Various field devices 11, 12, 13, 14 for process instrumentation are used to control the process 2.

Measuring transducers serve to record measured variables as process variables, such as temperature, pressure, flow quantity, level, density or gas concentration of a medium. By outputting controlled variables to actuators, the process sequence can be influenced as a function of recorded process variables, such as in accordance with the specifications of the automation program 10. As examples of actuators reference may be made to a control valve, a heater or a pump.

In the technical system 1, technical sequences, as already indicated above, are controlled by step sequences, which can also be referred to as sequencers. A step sequence represents a series of sequences of processing or production steps, which are defined by a program for controlling the operating sequence. When the individual steps are executed, the values of process variables can also underlie both production-related fluctuations and also fluctuations caused by errors. The monitoring of the steps is therefore helpful in identifying variances and error cases. In order to monitor the operation of the system 1, a plurality of data records, which are characteristic of the operation of the system, are detected and stored in a data storage unit 15. However, not all process variables, which are used in the technical system, are helpful when determining a reliable diagnostic statement. For automatic determination of the process variables that are relevant to the diagnosis, a program 17 for controlling the sequence during operation of the system 1 is analyzed via an evaluation device 16. The program 17 can correspond, for instance, to the source code of the totality of the sequential function charts present in the programmable logic controllers 6, 7, 8. During the analysis of the program 17, it is determined in particular which controlled variables are set in steps in the step sequence and/or which measured variables are queried in steps in the step sequence to check a transition condition. A coordinate in the n-tuples, which form the data records, is assigned in each case to the thus determined process variables. Furthermore, the evaluation device 16 can be used to automatically determine input and output variables of function blocks, for instance, which are likewise meaningful for the process 2 running on the system 1 and are included accordingly in the diagnosis. Data records of a number of good cycles in the step sequence are firstly evaluated via the evaluation device 16 and a self-organizing map is trained in the process. In this way, n-tuples with predetermined values of process variables and which correspond to the nodes of the self-organizing map are obtained for error-free cycles in the step sequence. The thus predetermined self-organizing map is used during subsequent operation of the system 1 to determine a diagnostic statement relating to the operation of the system 1. In such cases, data records that contain values of process variables relating to the respective execution time of individual steps in the step sequence are evaluated via of the evaluation device 16. The diagnostic statement can be archived in a log file for instance and/or displayed to an operator so that possible suitable error handling measures can be taken.

Figure 2:
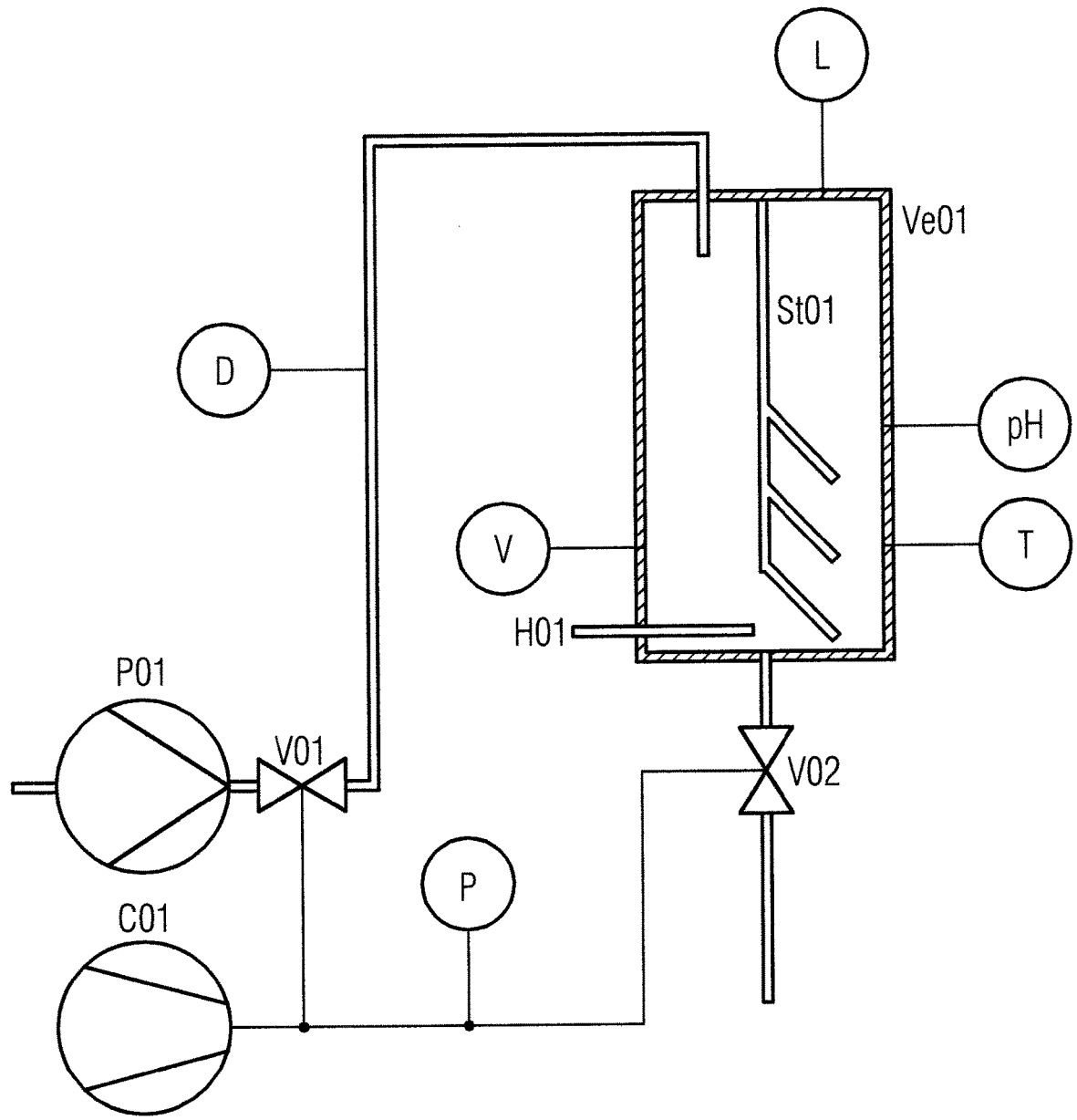
FIG. 2 shows a cutout of an R&I flowchart of the technical system in accordance with the invention.

The advantages achieved with the diagnosis are particularly clear from the specific exemplary embodiment explained below with the aid of FIGS. 2 and 3. FIG. 2 shows a cutout of an R&I flowchart of a simple system. A container VE01, such as a bioreactor, can be filled by way of a pump P01 and a control valve V01. A finished end product or an intermediate product can be removed from the container VE01 by way of a second control valve V02. The two control valves V01 and V02 are designed as pneumatic regulating valves and require compressed air for their operation, where a compressor C01 is provided to generate this. For improved understanding, measuring transducers, which are installed in the system to record a physical variable as a process variable, are identified below with a reference character that corresponds to the respective physical variable. For instance, the rate of flow D in the feed pipe that serves to fill the container is measured via the measuring transducer D in FIG. 2.

Figure 3:
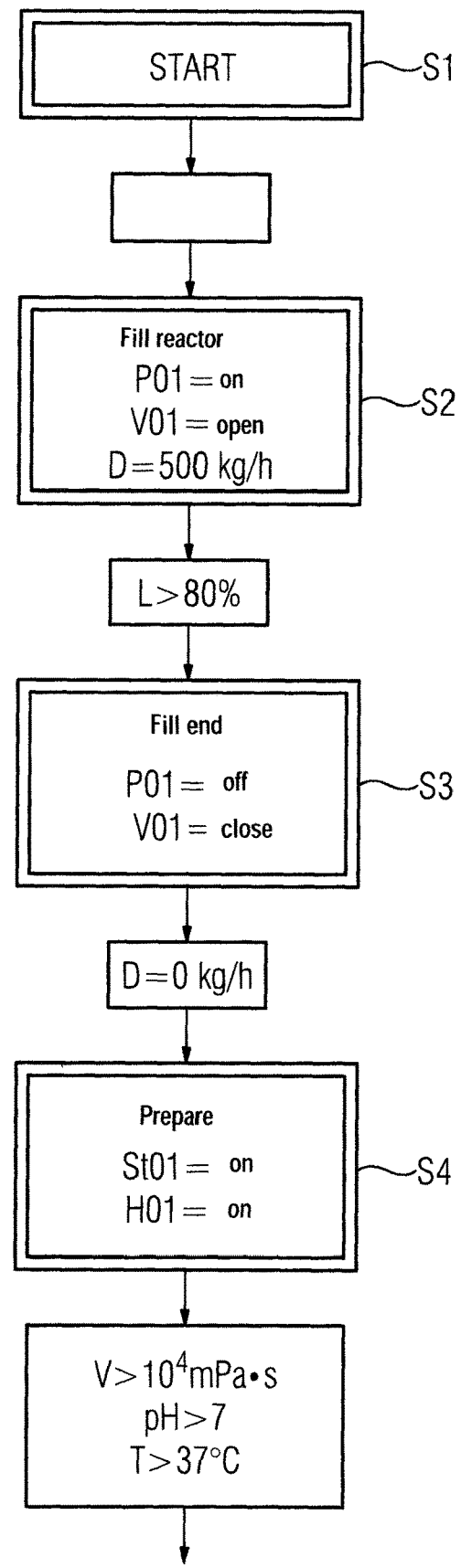
FIG. 3 shows a cutout from a sequential functional chart (SFC)

FIG. 3 shows a cutout of a step sequence, which controls the operation of the system part illustrated in FIG. 2. The step sequence starts with a step S1, which is provided with the labeling "START". In a step S2 with the labeling "Fill reactor", the pump P01 is switched on in accordance with the labeling "P01-on", the control valve V01 is opened in accordance with the labeling "V01=open" and the flow rate D in the feed pipe is regulated to 500 kilograms per hour in accordance with the labeling "D=500 kg/h". The step S2 is executed until a transition condition is fulfilled. As a transition condition, in accordance with the labeling "L>80%", the system waits until the level L of the container VE01 has reached 80% of its maximum height. By analyzing the step S2 using the evaluation device (16 in FIG. 1), the process variables (actual value of the pump P01, position of the control valve V01) that represent controlled variables set in step S2, and the measured flow rate D and the level L, i.e., measured variables that are used to regulate the flow rate or to monitor that a predetermined threshold value has been reached, are automatically determined as process variables that are relevant to the diagnosis. In the next step S3 with the labeling "Fill end", the pumps P01 are switched off in accordance with the labeling "P01=off" and the control valve V01 is closed in accordance with the labeling "V01=close). As a transition condition the system waits until no further flow rate is measured at the flow measuring transducer D in accordance with the labeling "D=0 kg/h".

The actual value of the pump P01, the control value of the control valve V01 and the measured flow rate D are thus determined automatically as process variables that are relevant to the diagnosis. In step S4 that follows with the labeling "Prepare", a stirrer St01 and a heater H01 are switched on, in accordance with the labeling "St01=on" and labeling "H01=on" in each case, with which the container VE01 according to FIG. 2 is equipped. Transition conditions are specified as the reaching of a dynamic viscosity V of $10^4$ mPa·s, labeling in FIG. 3: "V>$10^4$ mPa·s", of a pH value>7, labeling "pH>7", and a temperature of more than 37° C., labeling "T>37° C.". On the basis of step S4, the actual values of the stirrer St01 and the heater H01, the measured viscosity V, the pH value and the temperature T are therefore automatically determined as process variables that are relevant to the diagnosis.

When individual steps of the cutout of a step sequence shown, for instance, in FIG. 3 are executed or based on a complete cycle of a step sequence, the monitoring of the process variables that are automatically determined as relevant to the diagnosis can now be achieved generically based on a self-organizing map for each step or based on a self-organizing map for the entire step sequence. The values of the process variables are used as data records that identify the operation of the system when individual steps are executed for a cycle of the step sequence. In order to learn the self-organizing maps, the values of a number of efficiently running cycles in the step sequence are used as training data.

After the learning process, at least one self-organizing map is obtained, which has data records in the form of n-tuples at each node, where each coordinate of the n-tuple stands for values of process variables of a step in the case of an error-free cycle. At the start of the learning process, a map of the size of 8×12 nodes can be used, for instance. After the learning process, the training data can be used to monitor the map size. If the map is too large, then some nodes of the map are encountered only once or not at all by the training data. If the map is too large, then a slightly smaller map size is selected for the further learning method and this map is re-learned based on the training data. In a further step, threshold values that are used to detect a variance from the normal behavior in a cycle of the step sequence to be checked are automatically deduced based on an evaluation of data records for error-free cycles. To this end, the respective winner nodes are ascertained with the data records and the maximum Cartesian distances in relation hereto are determined. As a threshold value, the maximum distance is then increased by a safety margin, which can amount to between 5 and 50%, for instance, preferably 15%. When a threshold value of this type is exceeded during subsequent operation of the system, the diagnostic statement is obtained in that a variance in the data record from the acquired self-organizing map is present for a cycle to be checked, which possibly indicates an error in the system.

During operation of the system 1 in FIG. 1, cycles to be checked of step sequences are evaluated based on the at least one previously acquired self-organizing map for monitoring purposes. For each cycle to be checked, the values of the process variables are recorded during the execution of the individual steps, stored in the data storage unit 15 and evaluated via the evaluation device 16. With the evaluation, that node of the at least one self-organizing map that has the smallest Cartesian distance from the data record of the cycle to be tested in each case is determined. The distance is compared with a predetermined threshold value, which is assigned to the respective node. If the threshold value is exceeded, there is variance from the normal behavior of the system operation, the cause of which may be a system error. For instance, this is shown as a diagnostic statement on the control and process monitoring device 5, so that an operator can trigger a further diagnosis or can take suitable maintenance measures.

If a self-organizing map is used in each case for each step, by comparing the values of the process variables, which were automatically determined as relevant to the diagnosis in the respective step, for each step of a cycle to be checked with the values stored as a coordinates of the n-tuple on the nodes of the respective self-organizing map, it is possible to determine error-free cycles, which individual steps have in particular varied and which process variables that are relevant to the diagnosis have caused the variance. A system operator or maintenance personnel can also be informed of this with the aid of an alarm or a suitable graphical display.

Figure 4:
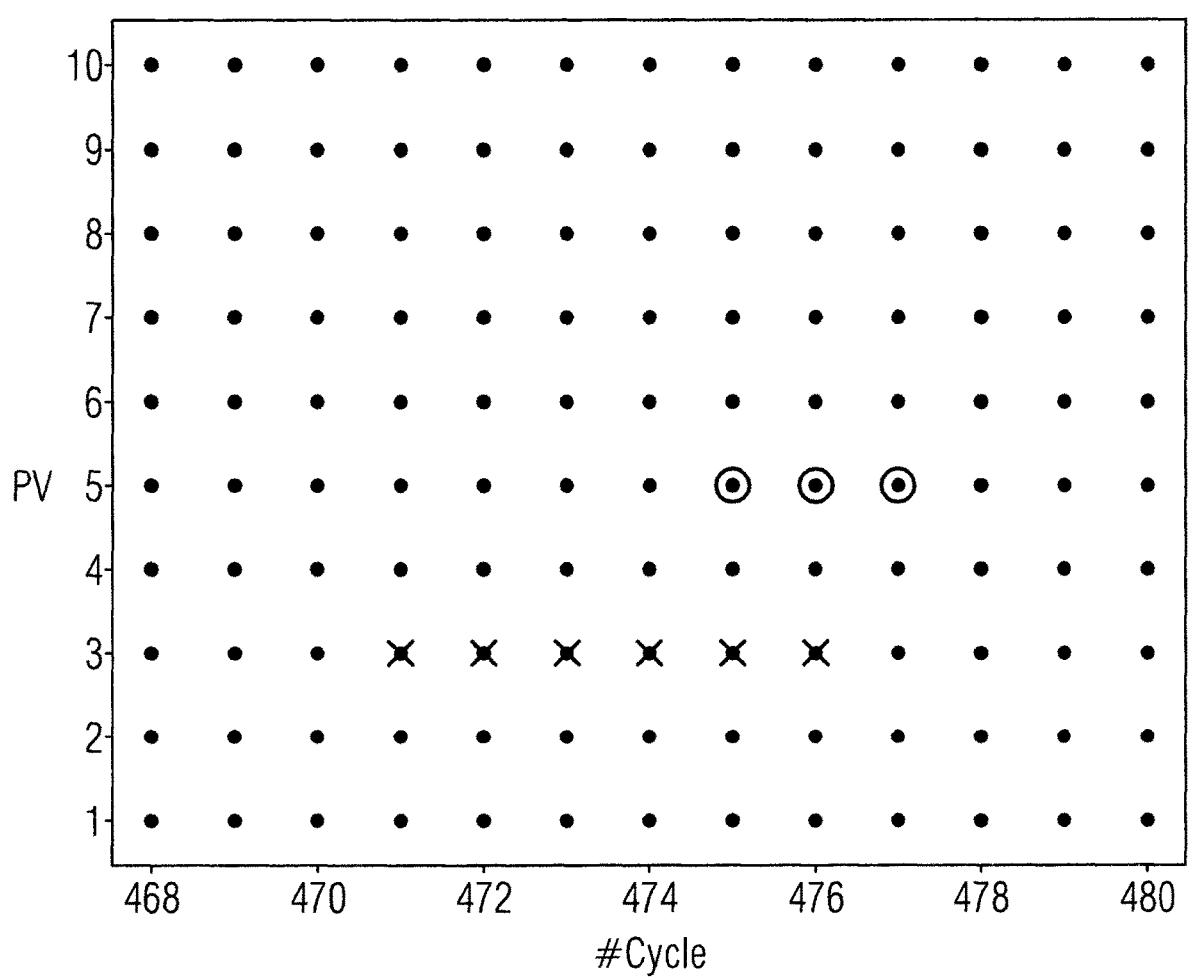
FIG. 4 shows a result diagram of the evaluation of various checked cycles in accordance with the invention.

FIG. 4 shows an example of a display, in which results from monitoring the operation of a technical system can be presented to an operator. Thirteen (13) cycles of a step sequence were monitored consecutively. The number of the respectively checked cycle is shown on the x-coordinate, which is labeled with "#cycle". The y-coordinate, labeled with "PV", bears the number of process variable that was determined as relevant to the diagnosis and was recorded in the evaluation. In a practical application, the number can correspond to the coordinate that is assigned to the respective process variable in the data records. A point drawn in the diagram indicates that the values of the respective process variable have no impermissible variances from an error-free cycle. A cross, drawn in as an "X", stands for the respective variable exceeding a threshold value in a step sequence cycle, a circle stands for a failure to reach the respective predetermined threshold value. On account of the support from the described diagnosis, it is now easy for an operator to identify that no violation of the predetermined threshold values has taken place solely in the cycles with the numbers 468 to 470 and 478 to 480. These cycles therefore largely correspond to the normal state. By contrast, with the cycles with the numbers 471 to 476, the threshold values are exceeded in the case of process variables with the number 3, and with the cycles with the numbers 475 to 477 a lower threshold value is not reached on account of values of the process variables with the number 5. On account of this information, the operator can now initiate a more detailed diagnosis to detect the cause of the error more precisely.

In the specific example of a technical system with the R&I flowchart cutout of FIG. 2, a compressor C01 with a storage container (not shown) for compressed air is additionally installed. A pressure P of the compressed air is monitored by a measuring transducer P. The compressed air is required as auxiliary power for the control valves V01 and V02, because their pneumatic drives are operated with compressed air. Values of the power consumption of the compressor C01 and of the pressure P in the compressed air pipes together with the values of the above-identified process variables, for instance, are transmitted via a field bus to realize a pressure regulation. The compressor C01 starts up sporadically when the pressure P does not reach a value of 6 bar. In such cases, the power consumption of the compressor C01 increases and the pressure P is again raised. These two process variables are, however, largely independent of the others and are not relevant to the production of the product produced in the container St01. They are therefore not determined as relevant to the diagnosis and are advantageously excluded from the evaluation for determining a diagnostic statement. If, by contrast, as described in the afore-cited article by Frey, all values of process variables transmitted via the field bus were used for evaluation purposes, the use of the non-relevant process variables (power consumption of the compressor C01 and pressure P) could possibly result in an incorrect diagnosis. Such an effect is advantageously avoided with the present diagnosis and thus increases the reliability of the diagnostic statements.

The advantages achieved by the new diagnosis are summarized again briefly below:

An important advantage in practice is the extensive ability to automate the diagnosis process. Causally associated process variables can be determined in a fully automatable manner from engineering information of a control system by program analysis. One or a number of self-organizing maps are acquired and dimensioned with the aid of historical data. During the operation of the system, cycles of step sequences can be monitored automatically. Variances are promptly identified and can be communicated to the system operating personnel. On account of the extensive ability to automate the diagnosis, this can also be used effectively in Cloud-based applications.

Furthermore, even variances that could previously not be readily identified by an operator on account of the complexity of the system can be detected.

Furthermore, error symptoms, i.e., values of the controlled and measured variables which impermissibly deviate from the normal state, can be detected and displayed. This assists the operating personnel of the system with finding the cause and can serve as a basis for a significantly automated diagnosis of the cause.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A diagnostic device for monitoring operation of a technical system with an automation system, comprising:
    a data storage unit in which at least one data record having values of process variables and which identifies the operation of the technical system is storable; and
    an evaluation device via which, based on the at least one data record and at least one predetermined self-organizing map, a diagnostic statement about the operation of the technical system is at least one of (i) determinable and (ii) displayed;
    wherein the evaluation device is configured to analyze automatically, during operation of the technical system, a program for controlling the sequence via repeatedly run step sequences to determine whether at least one part of the process variables is relevant to the diagnosis, the data record being an n-tuple with a plurality n of coordinates.

2. The diagnostic device as claimed in claim 1, wherein the evaluation device is configured to determine at least one of (i) controlled variables and (ii) measured variables set in steps in a step sequence, which are queried in steps in the step sequence to monitor a transition condition, as process variables which are relevant to the diagnosis.

3. The diagnostic device as claimed in claim 2, wherein the evaluation device is configured to use a data record and the predetermined self-organizing map to at least one of (i) determine and (ii) display the diagnostic statement for steps in the step sequence in each case.

4. The diagnostic device as claimed in claim 1, wherein the evaluation device is configured to use a data record and the predetermined self-organizing map to at least one of (i) determine and (ii) display the diagnostic statement for steps in the step sequence in each case.

5. The diagnostic device as claimed in claim 4, wherein the evaluation device is configured to automatically determine at least one of (i) controlled variables and (ii) measured variables set in a respective step, which are queried in the respective step for monitoring a transition condition, as process variables which are relevant to the diagnosis in the respective step.

6. The diagnostic device as claimed in claim 1, wherein n-tuples which correspond to data records and have predetermined values of process variables for error-free cycles in a step sequence are stored on a node of the at least one predetermined self-organizing map; and
    wherein the evaluation device is further configured to detect and indicate a variance in the system behavior during the cycle, to be checked, based on the at least one predetermined self-organizing map, in a step sequence from a behavior during error-free cycles.

7. The diagnostic device as claimed in claim 1, wherein the evaluation device is configured to determine a smallest Cartesian distance between the data record of a cycle to be checked and a node of the at least one predetermined self-organizing map to detect a variance in behavior of the technical system.

8. The diagnostic device as claimed in claim 7, wherein the evaluation device is configured to indicate, as a diagnostic statement, a variance from normal behavior in cases of the cycle, to be checked, in a step sequence if the Cartesian distance exceeds a predetermined threshold value.

9. The diagnostic device as claimed in claim 1, wherein the evaluation device is configured to store a plurality of data records identifying an error-free operation of the technical system to predetermine the at least one predetermined self-organizing map prior to a cycle, to be checked, in the data storage unit and configured to calculate n-tuples with values of process variables for error-free cycles for nodes based on said plurality of data records via a learning method and configured to deposit said n-tuples on the nodes of the at least one predetermined self-organizing map.

10. The diagnostic device as claimed in claim 9, wherein the evaluation device is configured to store further data records identifying an error-free operation of the technical system in the data storage unit prior to a cycle to be checked, determine a winner node for the each data record, calculate a respective maximum distances of the data records from winner nodes assigned thereto and to store said calculated respective maximum distance, in each case increased by a margin to avoid misdiagnoses, as predetermined threshold values assigned to the each winner node.

11. The diagnostic device as claimed in claim 1, wherein at least the data storage unit and the evaluation device are implemented via software on a remote service computer for remote diagnosis of the system.

12. A diagnostic method for monitoring the operation of a technical system, the method comprising:
    storing at least one data record which identifies the operation of the technical system and which has values of process variables in a data storage unit;
    determining a diagnostic statement about the operation of the technical system based on the at least one data record and at least one predetermined self-organizing map,
    analyzing automatically, during operation of the technical system, a program for controlling a sequence via repeatedly run step sequences to determine whether at least one part of the process variables is relevant to the diagnosis;
    assigning in each case a coordinate of the data record to the process variables previously determined as relevant to a diagnosis, the data record being an n-tuple with a plurality n of coordinates.

13. A non-transitory computer-readable medium encoded with a computer program which, when executed by a computer, causes operation of a technical system with an automation system to be monitored, the computer program comprising:
    program code for storing at least one data record which identifies the operation of the technical system and which has values of process variables in a data storage unit;
    program code for determining a diagnostic statement about the operation of the technical system based on the at least one data record and at least one predetermined self-organizing map;
    program code for analyzing automatically, during operation of the technical system, a program for controlling a sequence via repeatedly run step sequences to determine whether at least one part of the process variables is relevant to the diagnosis; and
    program code for assigning in each case a coordinate of the data record to the process variables previously determined as relevant to a diagnosis, the data record being an n-tuple with a plurality n of coordinates.

14. The non-transitory computer-readable medium as claimed in claim 13, wherein the non-transitory computer-readable medium comprises a storage medium.

* * * * *